United States Patent [19]

Petigrew et al.

[11] Patent Number: 5,262,804
[45] Date of Patent: Nov. 16, 1993

[54] BAR CODE PRINTING

[75] Inventors: Robert M. Petigrew, Foxton; Alan J. Harry, Royston, both of United Kingdom; Paul R. Nailor, London, England; Fred Adelmann, Eberbach am Neckar, Fed. Rep. of Germany; Peter Franzen, Hirschhorn am Neckar, Fed. Rep. of Germany; Juergen Schoon, Eberbach am Neckar, Fed. Rep. of Germany

[73] Assignee: Esselte Meto International Produktions GmbH, Hirschhorn am Neckar, Fed. Rep. of Germany

[21] Appl. No.: 667,194

[22] Filed: Mar. 11, 1991

Related U.S. Application Data

[63] Continuation-in-part of Ser. No. 392,711, Aug. 11, 1989, abandoned.

[30] Foreign Application Priority Data

Aug. 12, 1988 [GB] United Kingdom ............... 8819175

[51] Int. Cl.⁵ .................... B41J 3/39; B41J 2/01; B65C 11/02
[52] U.S. Cl. ................ 346/140 R; 235/432; 346/143; 400/88; 400/103; 156/DIG. 49
[58] Field of Search ............ 346/140 R, 143, 75, 346/76 PH, 153.1, 155, 157–160; 235/432, 462, 472; 400/88, 103, 126; 156/384, 577, 579, DIG. 47, DIG. 48, DIG. 49

[56] References Cited

U.S. PATENT DOCUMENTS

| | | | |
|---|---|---|---|
| 4,264,396 | 4/1981 | Stewart | 346/76 PH |
| 4,313,684 | 2/1982 | Tazaki | 346/140 R |
| 4,332,487 | 6/1982 | Bovio et al. | 346/140 R X |
| 4,333,088 | 6/1982 | Diggins | 346/140 R |
| 4,746,932 | 5/1988 | Sato | 346/76 PH |
| 4,914,562 | 4/1990 | Abe et al. | 346/140 R |

OTHER PUBLICATIONS

Bar Code News, "Bar Code Printing," Jan./Feb. 1984, pp. 6–9.

Primary Examiner—Benjamin R. Fuller
Assistant Examiner—Alrick Bobb
Attorney, Agent, or Firm—Poms, Smith, Lande & Rose

[57] ABSTRACT

A device suitable for printing bar codes is disclosed, this device comprising a housing, means for holding a label supply roll, printing means for applying indicia to a label, means for supplying data to determine the nature of the indicia printed on the label, and means for supplying electrical energy to operate the device, characterised in that said print unit is an ink jet printer.

23 Claims, 6 Drawing Sheets

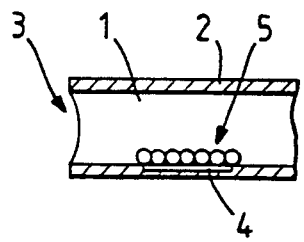
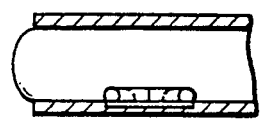
Fig. 1(a)  Fig. 1(b)
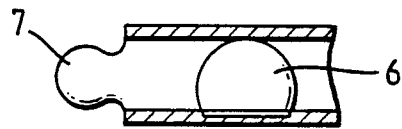
Fig. 1(c)
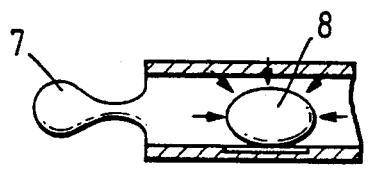
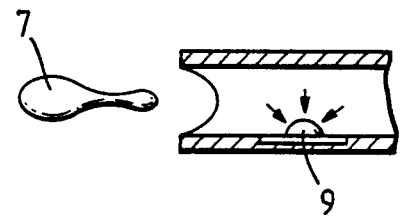
Fig. 1(d)  Fig. 1(e)
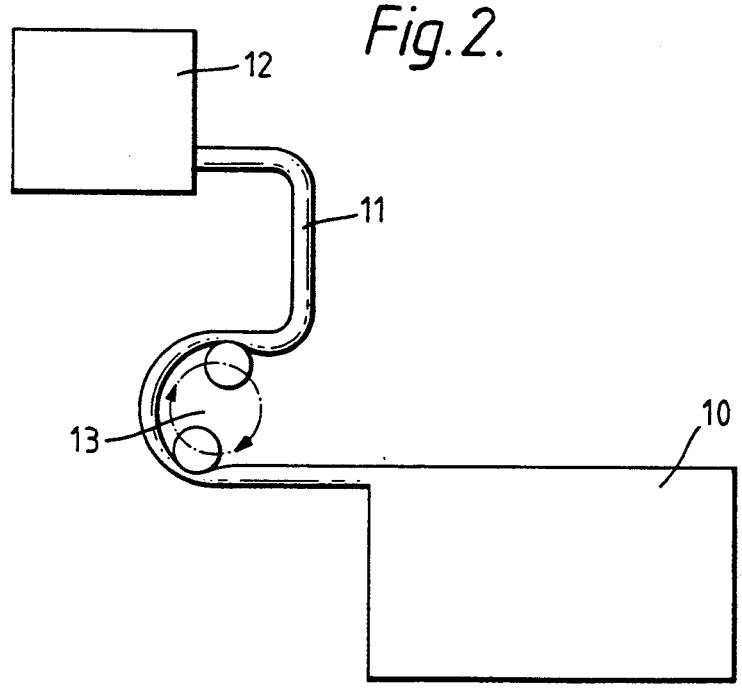
Fig. 2.

BAR CODE PRINTING

CROSS REFERENCE TO EARLIER APPLICATION

This is a continuation-in-part of application Ser. No. 07/392,711 filed on Aug. 11, 1989, abandoned on behalf of the same inventors."

This invention relates to bar code printing and, more particularly but not exclusively, is concerned with the generation of indicia which constitute the bar code.

Bar codes are now widely used for ready identification of products at goods-in and check-out locations associated, for example, with retail trading. They facilitate the use of fully automatic in-and-out systems and, in some instances, do away with the need for price labels on the products. Many supermarkets stock 25,000 to 30,000 items for sale, however, and do not have sufficient shelf space to allocate all of these items to a particular position; as a result, even if there is a bar code on such products, there is still a need for price marking. Nevertheless, the use of a bar code scanning system to identify the goods may reduce labour requirements significantly and thus produce considerable savings.

In supermarkets, typically 95-96% of food items going through the check-out have a bar code already printed at source by the manufacturer. For non-food items, the number of products bar coded at source is typically 80-85% of those going through the check-out.

In order to apply price labels to items already carrying a bar code, and to add a bar code to those products which are not coded at source, it is common for a ratail outlet to use one or more label printers. These may be hand-held or fixed in position. typically, three stationary printers may be used by up to ten people. Strips of labels will be printed and taken to the product and either applied by hand or with a dispenser. Some retailers consider that it is more economical for each operative to have his own hand-held bar code label printer.

If a national bar code has been allocated to a given product, this will normally be used by the retailer if no manufacturer's bar code is present. For products where no such national bar code has been allocated, it is up to the retailer to decide on his own bar code number. Typically, this number might be based on the numbering system used by the retailer before the introduction of bar code scanning to his store. In practice, the person generating bar codes with a printer will have with him source material which indicates the nature of the bar code for each product where a label is required.

Hand-held labelling machines typically comprise a housing which is arranged to store a label supply roll; a printing unit; and a keyboard for inputting data. When such a machine is used to print bar code labels, an operative will input the bar code number via the keyboard, which then activates a label feed mechanism and the printing unit to apply the requested bar code to one of the labels on the supply roll. After the bar code has been printed, the label feed mechanism moves the supply roll so that the printed label is accessible for application to the appropriate goods item.

The printing unit in a typical bar code printer or labelling machine is based on a thermographic printing head. This is conventionally used in conjunction with thermographic paper. This need for a special quality of paper in conjunction with the high peak currents needed to heat the image elements of the thermographic print head tend to limit the versatility of bar code printers and to limit the operating time where the power supply for the printer is an internal battery.

If the high peak currents required by, for example, current solid state thermographic printing heads can be avoided, it may also be possible to simplify the electrical circuitry associated with the printer since there will be less need to take into account hysteresis effects (temperature against time) resulting from sequential use of the same dot matrix element on the print head.

There is therefore a need for a bar code printer/labeller which overcomes or ameliorates the above disadvantages.

According to one aspect of the present invention, there is provided a device suitable for printing bar codes, which comprises a hand-held housing, within which are disposed means for holding a label supply roll, printing means for applying indicia to a label, means for supplying data to determine the nature of the indicia printed on the label, and drive means operating the device, characterised in that said print unit is an ink jet printer.

In another aspect, the invention provides a device suitable for printing bar codes, which comprises a housing, means for holding a label supply roll, printing means for applying indicia to a label, means for supplying data to determine the nature of the indicia printed on the label, and means for supplying electrical energy to operate the device, characterised in that said print unit is a non-impact printing device, e.g. an electrographic or xerographic image forming unit; or an ink jet printer; or a non-thermal contact print assembly.

Where the print unit is an electrographic print unit, it may comprise an array of ion sources located closely adjacent to an electrographic drum which is able to receive and hold electrical charge resulting from ions impinging on the surface of the drum. To operate such a print unit, a predetermined array of ion generating units is operated so as to transfer to the drum a predetermined pattern of electrical charge. The drum is then rotated to come into contact with a label, which is then coated with toner particles which adhere to charged regions only. The toner particles are then fused to generate the desired image on the label.

A xerographic print head functions in a manner similar to that described above, except that instead of an array of ion generating units, there is employed an array of light sources, for example light emitting diodes, adjacent to an amorphous silicon photoconductor drum. The generation of an image from the latent image held on the drum surface involves toner and a toner fusing system. Such a xerographic print unit may be robust, compact and possess a long operating life.

Where the print unit comprises an ink jet printer, this may operate according to any acceptable technology, for example as a bubble ink jet or as a solid ink jet. In a bubble ink jet, a heating element is located in the side wall of a nozzle containing liquid ink. The heater is energised so that ink in contact with the heater is warmed abruptly, resulting in rapid evaporation of the liquid ink thereby generating rapidly inflating bubble. As the bubble expands across the width of the nozzle interior, it expels a liquid droplet from the nozzle orifice. As the heater element is de-energised, the ink bubble deflates and either vanishes or remains only as a very small, vestigial bubble. In stationary printers which operate with an ink jet mechanism, it is the supply of ink which can be arranged so that there is substantially no drop in supply pressure during extended operation of the printer. In the present invention, however, care is required in the design and positioning of the ink jet print head, the ink reservoir and the associated tubing so as to achieve good performance over the life of the ink cartridge. For instance, as the level of ink in the reservoir drops, the hydrostatic pressure at the outlet from the reservoir changes. The overall system must therefore be carefully designed to be affected as little as possible by such changes. In a hand-held printer, the difficulties of achieving good performance under all conditions are compounded by the wide range of orientations in which the printer can be used. If, for instance, the printer is to be used upside down, then the relative position of the ink reservoir and the print head will be reversed; thus a system originally intended to operate with the ink reservoir below the print head will have to be capable of functioning with the reservoir above the print head, and vice versa. This demands that special measures are taken to ensure that good performance is consistently obtained. In one embodiment, this is achieved by ensuring that the tubes which connect the ink reservoir to the print head are of such a small diameter that the capillary forces acting between the ink and the internal surfaces of the tubes are large compared to the effect of gravity. Another approach is to supply the liquid ink to the print head by means of a positive displacement device such as a peristaltic pump. The delivery of ink by the pump is then synchronised with the demand for ink by the print head.

Plain paper labels may be used with such an ink jet, and the consumption of ink is low since none is wasted during the printing operation.

Another form of ink jet printer is the so-called solid or hot melt ink jet. With this system, a wax-based ink, normally solid, is melted to form a liquid reservoir adjacent to the ink jet print head. The print head ejects droplets of the molten ink on demand. Typically, a plug of solid ink is contained within a cylinder against which a plunger is biassed. That end of the cylinder opposite the plunger is provided with a heating element which is generally located about an outlet conduit for molten ink. The heater in the end face of the cylinder is operated so as to melt a predetermined amount of the solid ink which then travels along the outlet conduit to the print head, from which it is ultimately ejected. The interior of the outlet conduit forms a liquid reservoir. Solid ink jet printers usually require a warm-up period in which the liquid reservoir fills and reaches equilibrium.

With a solid (hot melt) ink jet, the ink has almost solidified when it contacts the substrate. Consequently, the substrate need not be absorbent and high quality printing is possible on a wide range of substrates. Since wax-based inks contain no volatile materials, they do not "dry" in the nozzle. Also, a thick and hence optically dense layer of ink can be formed by overprinting should this be required to obtain improved contrast.

Where the print unit comprises non-thermal contact print assembly, this will generally be a mechanical contact system, and is preferably in the form of an array of marker elements, for example fibre markers, in contact with an ink source. Such marker elements can be arranged in a lateral array with adjacent markers being in contact with one another. The marker elements are moved upwardly and downwardly so as to break and make contact with the substrate on which indicia are to be printed. Control of such movement is preferably achieved by means of a cam wheel in contact with the ends of the marker elements remote from the substrate, although other mechanical or electromechanical systems may be used if desired. Such a print unit functions, in essence, as an array of pens each of which is in contact with its neighbour. An alternative arrangement (which does not require contact between adjacent writing elements) involves a non-linear array in which adjacent marker elements are staggered. Like a linear arrangement of contiguous marker elements, the staggered arrangement also permits the generation of broad or narrow lines when the substrate is moved orthogonally with respect to the array of marker elements.

A mechanical arrangement such as that just described may be used to print a bar code (when the substrate will move relative to the print unit) or to print a dot matrix (when the substrate is held stationary while marker elements are lowered into contact and then raised again before the substrate is advanced).

Because of the nature of standard bar codes, a print unit constructed as just described may include a plurality of thumb wheels (one for each digit) which can move the appropriate marker elements (for example by actuating cam wheels) downwards towards the substrate so as to convert the numerical input data for the code into the visual indicia of the bar code itself.

According to another aspect of the present invention, the print unit in a device of the type described hereinbefore comprises a glass rod-type or true-edge type print head. With the former, an array of thin film resistive elements are formed on the surface of a glass rod. Both types of print head can be used for direct or transfer thermal printing. The radius of the glass rod or of the true edge allows transfer tape to be peeled away from the substrate very close to the print position. This gives better quality because the ink that has been melted and transferred is still soft and does not tear away from the rest of the ink layer. This provides particular advantages in allowing well defined edges of a bar code to be printed. The radius or edge gives rise to line contact and hence much higher pressure between transfer tape and substrate. Print heads of the type under consideration will also generate a higher pressure during direct thermal printing and this can result in improved quality on thermographic labels. Alternatively, the contact force can be reduced to give a pressure comparable with that of conventional print heads; the lower contact force will then result in lower losses due to friction, and can be expected to prolong operating life. Heat dissipation in these systems is also generally greater than that of a conventional solid state thermographic print head, and the print unit operates at relatively low voltage.

For a better understanding of the invention, and to show how the same may be carried into effect, reference will now be made, by way of example, to the accompanying drawings in which:

FIGS. 1A–1E illustrates schematically the mode of operation of a bubble ink jet printer;

FIG. 2 illustrates an orientation-insensitive means of transferring ink to an ink jet print head;

Figure 3:
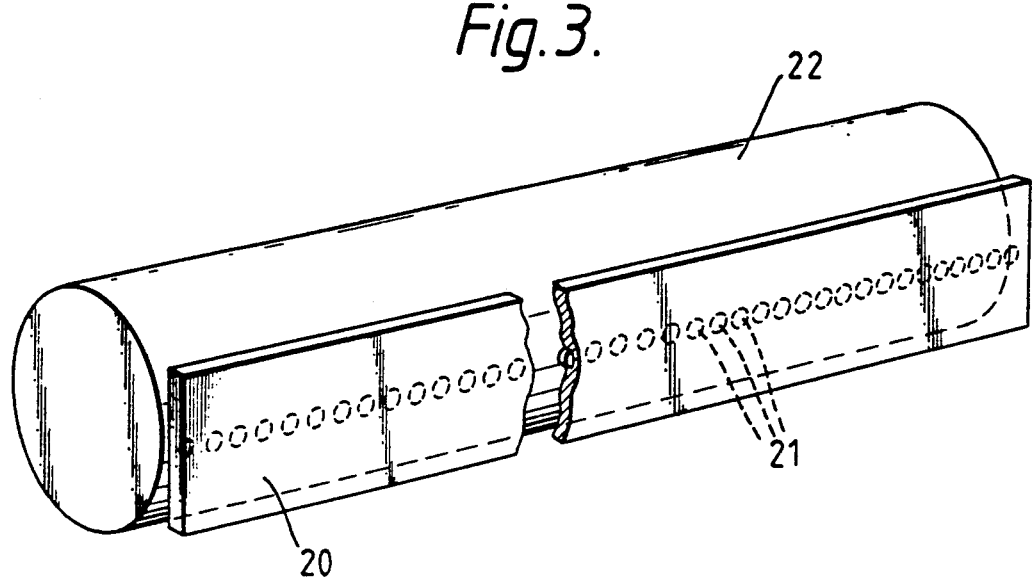
FIG. 3 illustrates part of a xerographic print unit.

Referring to FIGS. 1A-1E, a volatile liquid ink 1 is contained between the walls of a conduit 2 one end 3 of which constitutes a nozzle orifice. A heating element 4 is disposed in one part of the conduit 2. The sequence illustrated in FIGS. 1A-1E shows the effect of actuating heating element 4. Initially, heat generated in the wall of the conduit 2 gives rise to a series of small bubbles 5 located adjacent to the heating element 4. As heat is transferred into the liquid ink, it evaporates abruptly which causes the bubbles 5 to coalesce and inflate during which condition the bubble extends across the entire width of conduit 2. This condition is shown in FIG. 1(c) where the bubble 6 is at its maximum size. The volume expansion associated with bubble formation and inflation results in progressive ejection of liquid material from orifice 3. Thus a droplet 7 begins to form and ultimately detaches itself from the liquid column within conduit 2 (see FIG. 1(e)). Deflation of the bubble as at 8 continues until only a vestigial bubble 9 remains.

FIG. 2 illustrates a supply system for conveying liquid ink from a reservoir 10 via a conduit 11 to a print head 12. So as to be orientation-independent, a peristaltic pump 13 is positioned to act upon conduit 11. In the schematic illustration given, the peristaltic pump has two rollers; other configurations may be used if desired.

Referring now to FIG. 3, part of a xerographic print unit comprises an array 20 of light emitting diodes 21. These are positioned close to an amorphous silicon photoconductor drum 22.

Figure 4:
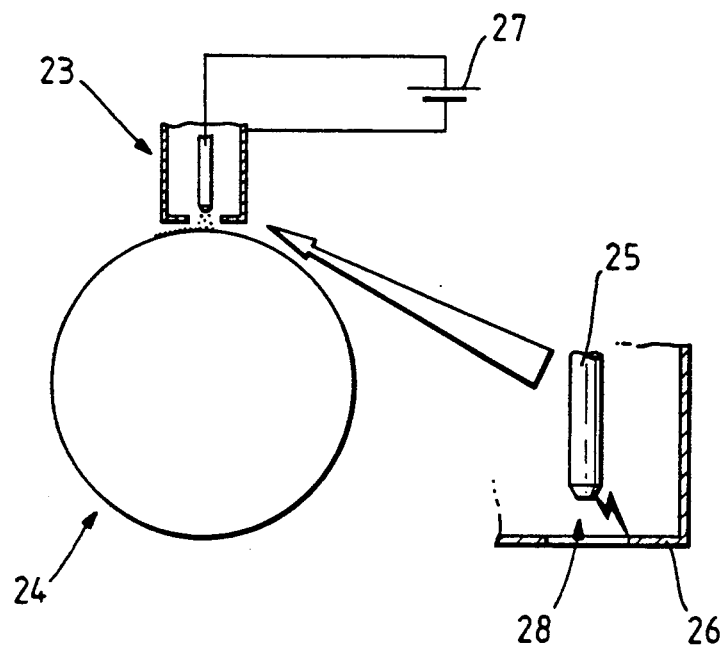
FIG. 4 illustrates part of an electrographic print unit.

Referring next to FIG. 4, part of an electrographic print system comprises an array of ion generating units 23 located close to an electrographic drum 24. The ions are generated by means of an electric discharge between a central electrode 25 and housing 26. The elements 25 and 26 are connected to opposite poles of a switchable high voltage source indicated schematically at 27. The housing 26 includes an opening 28 through which ions formed by the electric discharge travel towards drum 24.

Figure 5:
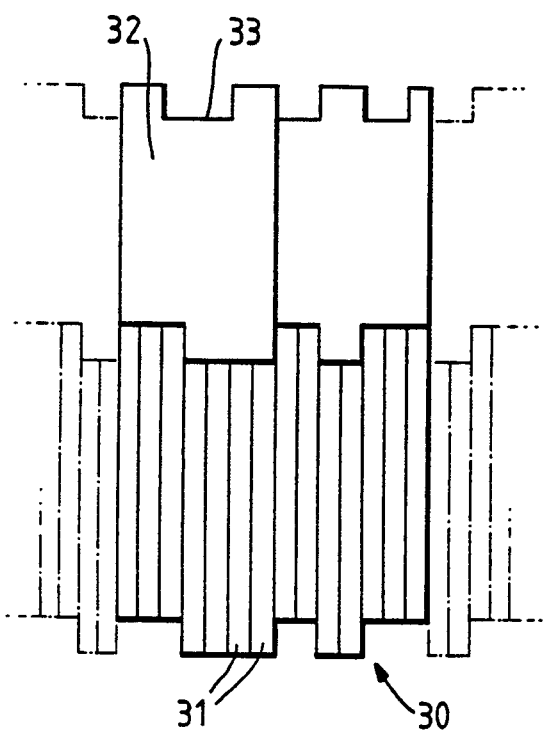
FIG. 5 shows a schematic representation of a series of mechanical contact print elements.
Figure 6:
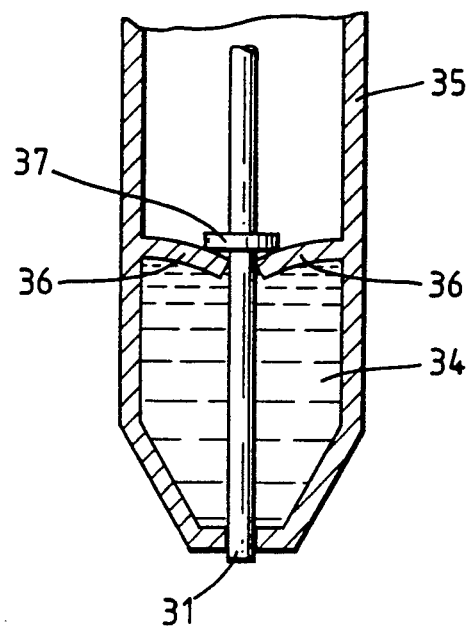
FIG. 6 is a cross-sectional view through the array of markers shown in FIG. 5.

Referring next to FIGS. 5 and 6, a print unit includes an array of fibre markers 30 arranged in side-by-side, contiguous relationship. Each individual marker element 31 can be raised or lowered by a cam wheel 32 having a cam face 33. As can be seen from FIG. 6, the array of fibre markers 31 are positioned within an ink reservoir 34 which itself is bounded by housing 35 and return springs 36. A flange 37 secured to the fibre markers 31 at a point intermediate their length serves to act as a stop member when it comes into contact with return springs 36. This arrangement limits the extent of downward movement of fibre markers 31.

Figure 7:
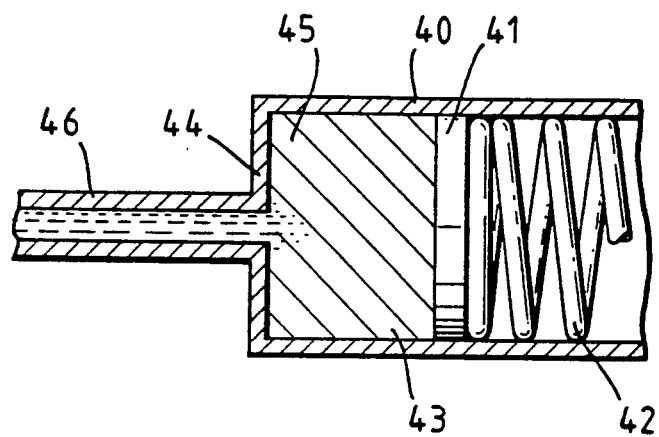
FIG. 7 illustrates part of a solid (hot melt) ink jet print system.

Referring now to FIG. 7, a solid ink jet print unit comprises a cylinder 40 containing a plunger 41 biassed by compression spring 42. A plug of solid waxbased ink 43 is disposed between the end of plunger 41 and face 44 of cylinder 40. Face 44 includes an annular heating element 45 at the centre of which is an outlet conduit 46. In use, the heating element 45 melts some of the solid ink 43 which then travels along conduit 46 to generate a reservoir of molten ink.

Figure 8:
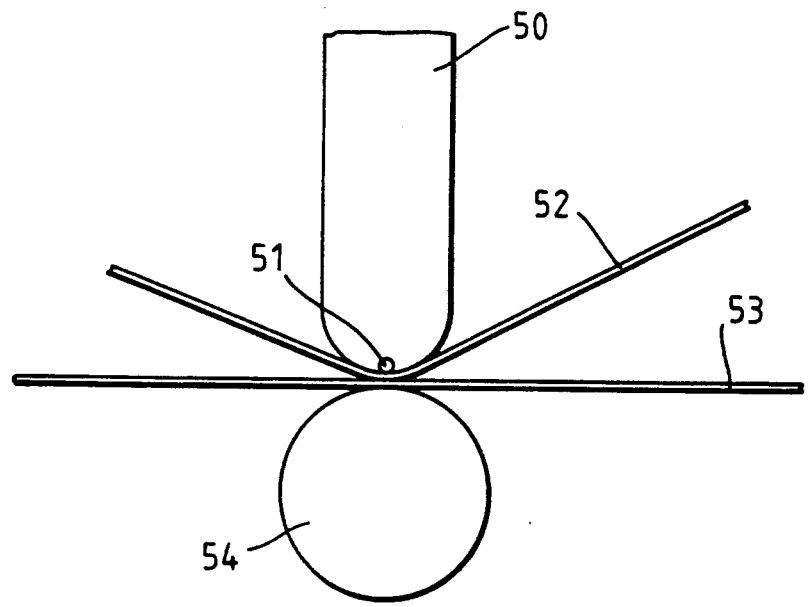
FIG. 8 illustrates a true edge type print head operating with a thermal transfer tape.

Referring now to FIG. 8, a print head comprises a support element 50 having heating elements 51 at its apex, which is in the form of a true edge. Heating elements 51 contact a thermal transfer tape 52 which in turn contacts a substrate 53, for example in the form of a roll of labels. On the other side of the substrate 53 is a pressure roller 54.

Figure 9:
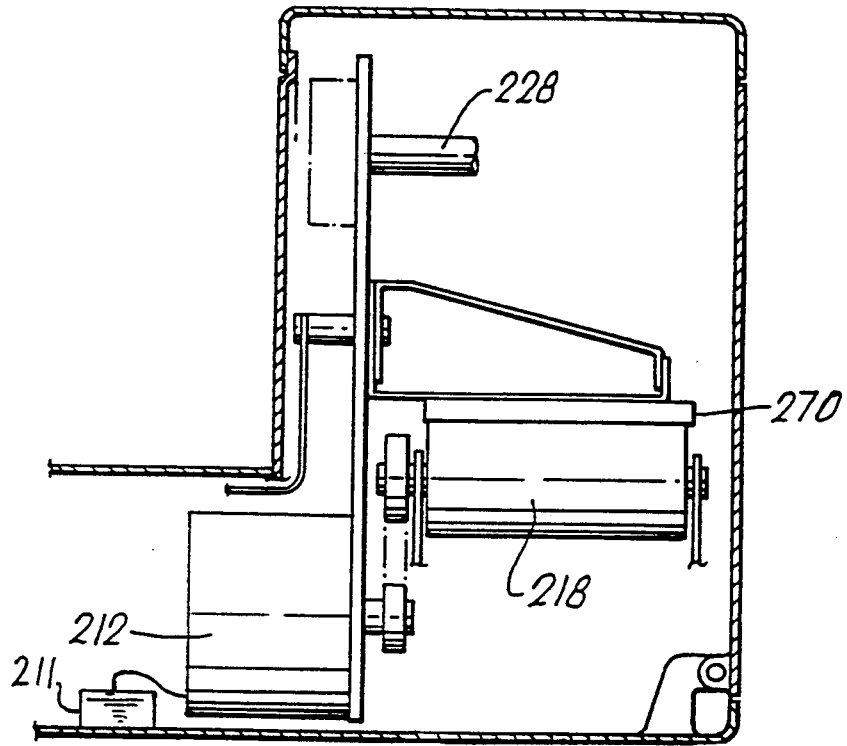
FIG. 9 illustrates certain internal components of a printing device in accordance with this invention.

FIG. 9 illustrates a printing unit which may be used in the present invention. The printing unit comprises a stepper motor 212, a roller 218 driven indirectly by motor 212, a print head 270 adjacent to roller 218 and a spool 228 for a label roll. Electrical power for stepping motor 212 is supplied by battery 211. Print head 270 may be any one of the types described above, and is depicted purely schematically in FIG. 9.

Figure 10:
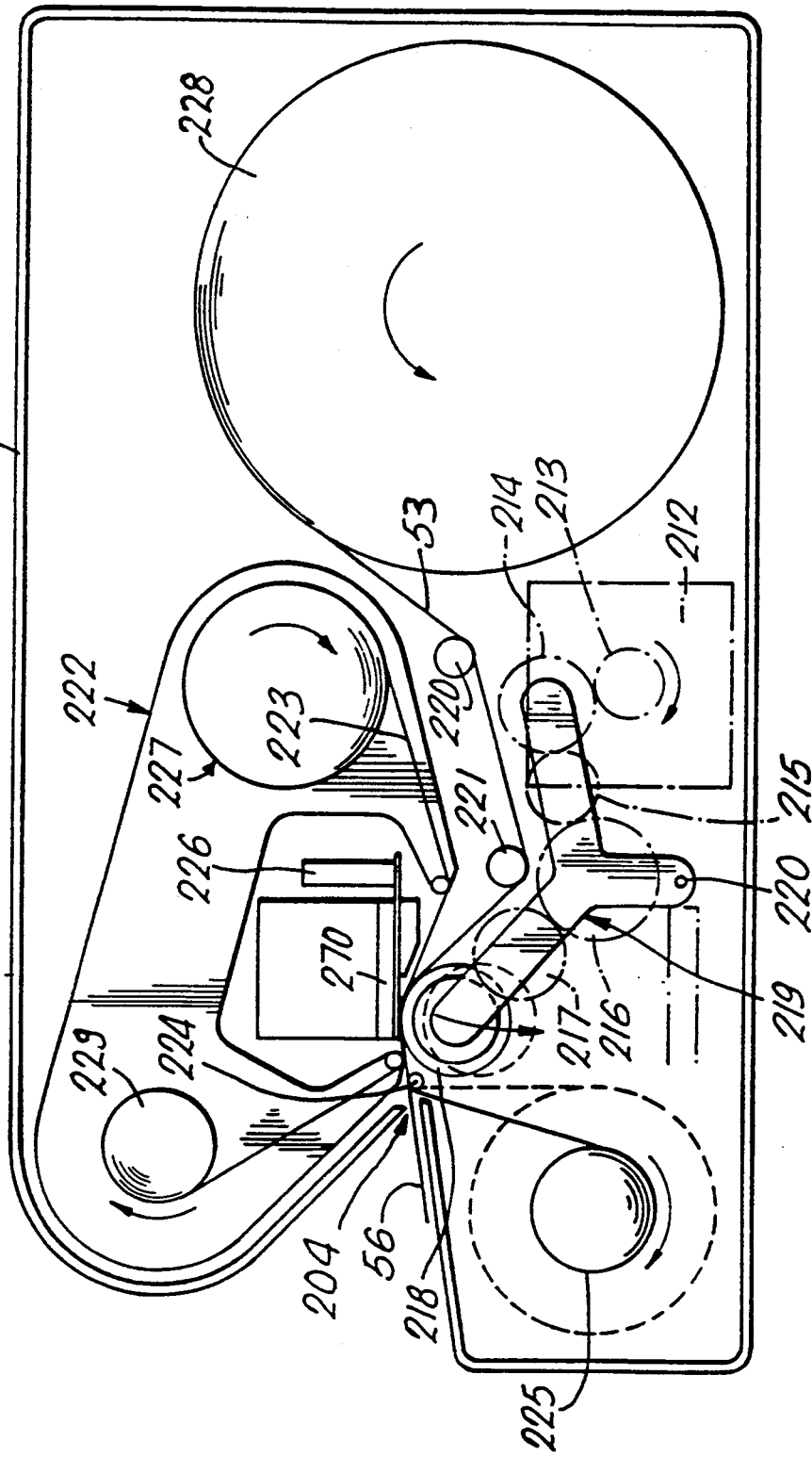
FIG. 10 illustrates a cross-sectional view through a printing unit in accordance with this invention.

FIG. 10 illustrates a printing unit in cross-section. The unit is located in a housing 211. A label supply roll 228 feeds a strip 53 of labels to print head 270 which is of the true edge type as illustrated in FIG. 8. Stepper motor 212 has a rotary output shaft 213 which drives a roller 214. Slave rollers 215, 216, 217 and 218 are themselves driven by roller 214. This bank of rollers (214–218) is supported by a generally Y-shaped mounting mechanism 219 one arm of which is pivotally mounted at 220. Clockwise rotation about pivot 220 brings the roller 214 into contact with drive 213, and also brings the label strip 53 into contact or near contact with the print head 270 (by the action of roller 218). The course of the label roll 53 towards print head 270 is guided by capstans 220 and 221. A cassette 222 containing thermal transfer ribbon 223 is located about the print head 270, and includes a let out roll 227 and a take up roll 229. After leaving the print head 270, the substrate 53 moves towards outlet slot 204. Just upstream of this slot, the label backing roll passes over a roller 224 to be wound onto a take-up spool 225. A printed label 56 simultaneously issues from slot 204.

As illustrated in FIG. 10, the cassette 222 fits symmetrically around the print head 270. Control circuitry 226 for the print head 270 is provided as shown. By means known per se, control circuitry 226 serves to supply data to determine the nature of the indicia to be printed.

It will be appreciated that an arrangement such as illustrated in FIG. 10 may be easily adapted for use with other types of print head; where there is no need to use a thermal transfer tape 223, the cassette 222 can be dispensed with.

Figure 11:
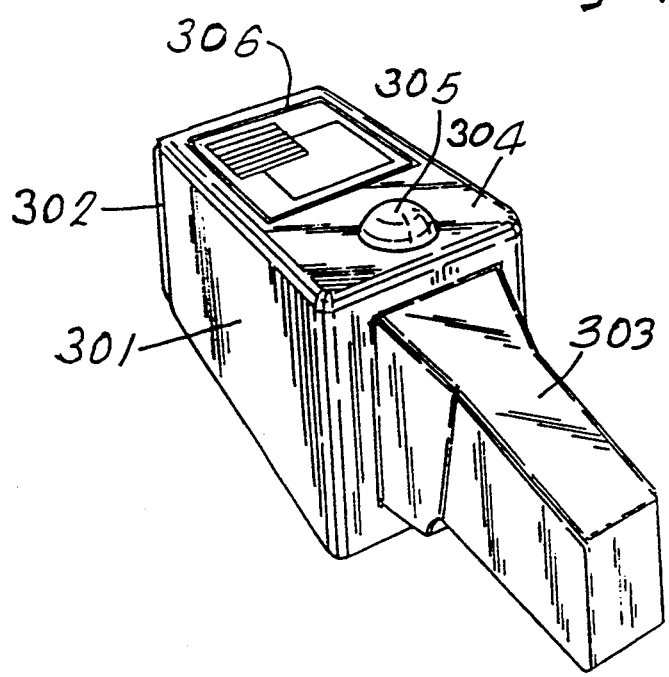
FIG. 11 illustrates the external features of a printing unit such as that of FIG. 9 or FIG. 10.

Referring next to FIG. 11, the external appearance of one embodiment of a printing device in accordance with this invention is illustrated. The hand-held printer comprises a housing 301 which includes a front face 302 and a handle or grip 303. The top face 304 of the printer carries a screen display 306 and a tracker ball control element 305. Tracker ball 305 works in conjunction with the displays appearing in screen 306 in an entirely conventional manner; this aspect of operation of the printer does not constitute a part of this invention.

We claim:

1. A device suitable for printing bar codes, which comprises a hand-held housing, within which are disposed means for holding a label supply roll, printing means for applying indicia to a label, means for supplying data to determine characteristics of the indicia printed on the label and drive means operating the device, characterized in that said printing means comprises a liquid bubble ink jet unit including a conduit having at one end an aperture, a heating element disposed within the conduit proximate the conduit aperture and a positive displacement means for conveying ink from a reservoir to said print unit.

2. A device as claimed in claim 1, wherein said positive displacement means is a peristaltic pump.

3. A device as claimed in claim 1, wherein said positive displacement means includes tubing connected to said reservoir and having a sufficiently small diameter that capillary forces acting between liquid ink within said tube and internal surfaces of the tubing exceed weight forces of ink within the tubing.

4. A device as claimed in claim 1, wherein said drive means is a battery operated stepping motor.

5. A device suitable for printing bar codes, comprising a hand-held housing, within which are disposed means for holding a label supply roll, printing means for applying indicia to a label, means for supplying data to determine characteristics of the indicia printed on the label, and drive means operating the device, characterized in that the print means is a hot melt-type ink jet including:
a cylinder having a first end defining a narrow aperture and second end configured to accommodate a plunger so as to form a reservoir within the cylinder for storing ink normally solid at room temperature;
an annular heating element disposed within the cylinder adjacent the first end of the cylinder defining the narrow aperture;
a conduit having one end forming an ink jet nozzle and another end communicating with the narrow aperture of the first end of the cylinder; and
a compression spring configured to pressurize the interior of the cylinder, wherein the heating element melts a portion of the solid ink which is forced into the conduit and ejected from the ink jet nozzle of the conduit and onto a label on demand.

6. A portable hand-held device for printing labels, comprising:
a compact hand-held housing;
means, coupled to said housing, for holding labels;
data means, disposed within the housing, for determining identifying marks to be printed on the labels;
printing means including a reservoir containing liquid ink, an ink ejecting conduit having one end from which ink is ejected and another end in communication with said reservoir, and a heating element disposed within the conduit adjacent the ink ejecting end of the conduit, wherein energization of the heating element causes evaporation of a portion of liquid ink within the conduit to expel a droplet from the ink ejecting end of the conduit on demand; and
battery means, coupled to the housing, for providing electrical power to operate the device, wherein bar codes and other indicia may be printed on the labels near items to which the labels will be affixed.

7. The portable hand held device of claim 6 further comprising fluid flow means for transporting ink from the reservoir to the ink ejecting conduit irrespective of the orientation of said hand held device.

8. The portable hand held device of claim 7 wherein said fluid flow means is a capillary tubing having a sufficiently small diameter that forces acting between liquid ink within said tubing and internal surfaces of said tubing exceed weight related forces acting on ink within said tubing.

9. The patentable hand held device of claim 7 wherein said fluid means is a peristaltic pump delivering ink to the injecting conduit in synchronism with a demand for ink from said printing means.

10. The portable device of claim 6 wherein said print means further includes a tube, conducting ink from said reservoir to the conduit, having a sufficiently small diameter that capillary forces between the ink within said tube and internal surfaces of the tube exceed the weight forces of the ink within the tube.

11. A portable hand held label printer, comprising:
a hand held housing;
a label supply coupled to said housing;
data means, disposed within said housing, for determining g identifying marks to be printed on the labels;
a reservoir of liquid ink;
an ink jetting tube having a first end from which ink is ejected and a second end receiving ink from the reservoir; and
a heating element in contact with said ink jetting tube proximate said first end, wherein activation of the heating element forms a bubble within the tube proximate said first end that expels a liquid bubble of ink on demand.

12. The portable hand held device of claim 11 wherein said heating element is disposed within the ink jetting tube.

13. The portable hand held device of claim 11 further comprising fluid flow means for transporting ink from the reservoir to the ink ejecting conduit irrespective of the orientation of said hand held device.

14. The portable hand held device of claim 11 wherein said fluid flow means is a capillary tubing having a sufficiently small diameter that forces acting between liquid ink within said tubing and internal surfaces of said tubing exceed weight related forces acting on ink within said tubing.

15. The portable hand held device of claim 11 wherein said fluid means is a peristaltic pump delivering ink to the ink ejecting conduit in synchronism with a demand for ink from said printing means.

16. A portable hand held label printer comprising:
a compact hand held housing;
label supply coupled to said housing;
display means, coupled to said housing, for determining identifying markings to be printed on labels; and
print means, disposed within the housing, including a solid supply of hot-melt type liquefiable ink and means for liquefying a portion of said solid ink and ejecting the liquefiable ink on demand.

17. The portable hand held printer of claim 16 wherein said print means includes a reservoir, within which the solid ink is disposed, and an output conduit communicating with said reservoir.

18. The portable hand held printer of claim 16 wherein said means for liquefying is a heating element disposed within the reservoir.

19. The portable hand held printer of claim 17 wherein said print means includes a spring disposed within the reservoir and biassing the solid ink towards the output conduit.

20. A portable hand held label printer comprising:
a hand held housing;
a label supply coupled to said housing;
data means, disposed within said housing, for determining identifying marks to be printed on labels;
a reservoir of liquid ink;

an ink jetting tube having a first end from which ink is ejected in a second end communicating with the reservoir;

a heating element in contact with said ink jetting tube proximate said first end; and a perastalic pump delivering ink to the ink jetting tube in synchronism with a demand for ink.

21. A portable hand held label printer comprising:

a compact hand held housing;

a label supply coupled to said housing;

data means, disposed within said housing, for determining identifying marks to be printed on labels;

a reservoir containing a solid mass of hot-melt type liquefiable ink;

an output tube coupled said reservoir;

biasing means, disposed within the reservoir, for biasing the ink toward the output tube; and heating element disposed adjacent the reservoir so as to heat and liquify a portion of said ink adjacent the output tube upon activation of said heating element, wherein a portion of the solid ink within the reservoir is melted, forced into the output tube and ejected on demand.

22. The portable hand held printer of claim 21 wherein said heating element is disposed within said reservoir proximate said output tube.

23. The portable hand held printer of claim 21 wherein said biasing means is a spring.

* * * * *